(12) United States Patent
Cho

(10) Patent No.: US 8,552,076 B2
(45) Date of Patent: Oct. 8, 2013

(54) FUSED AEROGEL-POLYMER COMPOSITE, METHODS OF MANUFACTURE THEREOF AND ARTICLES COMPRISING THE SAME

(75) Inventor: Myung Dong Cho, Gyeonngi-do (KR)

(73) Assignee: Samsung Electronics Co., Ltd. (KR)

( * ) Notice: Subject to any disclaimer, the term of this patent is extended or adjusted under 35 U.S.C. 154(b) by 879 days.

(21) Appl. No.: 12/100,566

(22) Filed: Apr. 10, 2008

(65) Prior Publication Data

US 2009/0082479 A1 Mar. 26, 2009

(30) Foreign Application Priority Data

Sep. 20, 2007 (KR) .................. 10-2007-0096058

(51) Int. Cl.
*C08F 116/06* (2006.01)
*C08F 12/08* (2006.01)
*C08J 9/00* (2006.01)

(52) U.S. Cl.
USPC ............ 521/54; 521/55; 521/62; 521/86; 521/136; 521/139; 521/142; 521/146; 423/324; 423/325; 524/543; 524/544

(58) Field of Classification Search
USPC ............... 521/54, 55, 61, 86, 136, 139, 142, 521/146; 423/324, 325; 524/543–545
See application file for complete search history.

(56) References Cited

U.S. PATENT DOCUMENTS

| | | | | |
|---|---|---|---|---|
| 5,124,364 A | * | 6/1992 | Wolff et al. | 521/55 |
| 5,731,360 A | * | 3/1998 | Pekala et al. | 521/54 |
| 7,118,801 B2 | * | 10/2006 | Ristic-Lehmann et al. | 428/292.1 |
| 2002/0025427 A1 | * | 2/2002 | Schwertfeger et al. | 428/331 |

* cited by examiner

*Primary Examiner* — Irina S Zemel
(74) *Attorney, Agent, or Firm* — Cantor Colburn LLP

(57) ABSTRACT

Disclosed herein is a method of preparing a fused aerogel-polymer composite in which aerogel and an organic polymer is mixed in a dry state to adsorb polymer particles on the surface of the aerogel and are then subjected to thermal treatment, thus forming a polymer coating on the aerogel. The fused aerogel-polymer composite can be used for thermal insulation in a variety of applications. The fused aerogel-polymer composite exhibits high thermal insulation properties and superior physical strength and processability while still maintaining the properties of an aerogel that does not have a polymer coated on its surface.

10 Claims, 2 Drawing Sheets (a) Aerogel
(b) Polymer-adsorved aerogel
(c) Polymer-coated aerogel

US 8,552,076 B2

FUSED AEROGEL-POLYMER COMPOSITE, METHODS OF MANUFACTURE THEREOF AND ARTICLES COMPRISING THE SAME

This non-provisional application claims priority under U.S.C. §119 from Korean Patent Application No. 10-2007-96058, filed on Sep. 20, 2007 with the Korean Intellectual Property Office (KIPO), the entire contents of which are hereby incorporated by reference.

BACKGROUND

1. Field the Invention

Disclosed herein is a fused aerogel-polymer composite, methods of manufacture thereof and articles comprising the same.

2. Description of the Related Art

Aerogels are nanoporous materials having a porosity of at least 90% with a surface area of up to about 1000 $m^2/g$. They are therefore low-density materials and can be either optically transparent or semi-transparent. Because of their low density, they are used for catalyst supports, in thermal and acoustic insulation, as well as in particle accelerators.

Silica aerogels are an example of aerogels that are used in a wide variety of applications. Aerogels are widely used as thermal insulation in refrigerators, freezers, and thermal reservoirs because of their high light transmittance and extremely low thermal conductivity. However, these materials are very brittle and undergo cracking and breaking upon being subjected to very small amounts of compression or impact. They are also easily damaged by the ingress of moisture into the pores.

In addition, because of the small pore size, silica aerogels are difficult to manufacture inexpensively. The small pore sizes lead to very large capillary forces that cause the silica aerogel to be easily crushed during drying. In order to overcome these capillary forces, the wet silica gel is subjected to supercritical extraction to produce the aerogels. Supercritical extraction uses high temperatures and high pressures. The use of supercritical extraction causes a dramatic increase in the cost as well as in the process time used for the manufacturing of the aerogels.

The brittleness and the low density of aerogels causes other problems in the processing of aerogels when it is desired to make a large piece of insulating composite that comprises the aerogel. Because of the low density of the aerogel, it is difficult to encapsulate the aerogel with a polymer to make a large monolithic composite without significantly altering the thermal insulating properties of the monolithic composite. In other words, because of the large volume occupied by the aerogel, a large amount of polymer has to be used to encapsulate the aerogel. This leads to a significant reduction in the capacity of the aerogel to act as a thermal insulator.

If a liquid polymer is used to bind the aerogel, the liquid enters the pores of the aerogel causing the aerogel to get crushed by the high capillary forces generated in the pores. This also leads to a reduction in the thermal insulating properties of the aerogel.

It is therefore desirable to manufacture an aerogel composite that retains the insulating properties of the aerogel while preventing or reducing the ingress of moisture or solvents into the pores of the aerogel.

SUMMARY

Disclosed herein is a method of preparing a polymer-coated aerogel comprising blending an aerogel with an organic polymer to form an aerogel-polymer composite; and heat treating the aerogel-polymer composite to form a fused aerogel-polymer composite.

Disclosed herein is a composite comprising an aerogel; and an organic polymer disposed on an outer surface of the aerogel; the organic polymer being physically bonded to the outer surface of the aerogel to form a fused aerogel-polymer composite.

Disclosed herein too are articles manufactured by the aforementioned method and from the aforementioned composite.

BRIEF DESCRIPTION OF THE FIGURES

Exemplary embodiments will be more clearly understood from the following detailed description, taken in conjunction with the accompanying drawings.

FIGS. 1(a) to 1(c) are schematic views illustrating the process of preparing a polymer-coated aerogel, according to the example embodiments;

FIG. 2 is an FE-SEM (Field Emission Scanning Electron Microscope) micrograph illustrating the cross-section of the polymer-coated aerogel obtained in Example 1;

FIG. 3 is an FE-SEM micrograph illustrating the outer surface of the polymer-coated aerogel obtained in Example 1; and FIG. 4 is an FE-SEM micrograph illustrating the outer surface of a conventional aerogel, which is not coated with a polymer, in Comparative Example 1.

DETAILED DESCRIPTION

Hereinafter, a detailed description will be given of the exemplary embodiments with reference to the appended drawings.

Disclosed herein is a method of manufacturing a fused aerogel-polymer composite that comprises aerogel that is coated with an organic polymer. The coating of the aerogel with the organic polymer prevents the ingress of moisture or solvents into the pores of the aerogel and thus prevents damage to the aerogel while at the same time preserving the thermal insulating properties of the aerogel. The method advantageously comprises coating particles of the aerogel with an organic polymer to form an aerogel-polymer composite. The aerogel-polymer composite is then heated to a temperature above the flow point of the organic polymer to form a fused aerogel-polymer composite.

Figure 1:
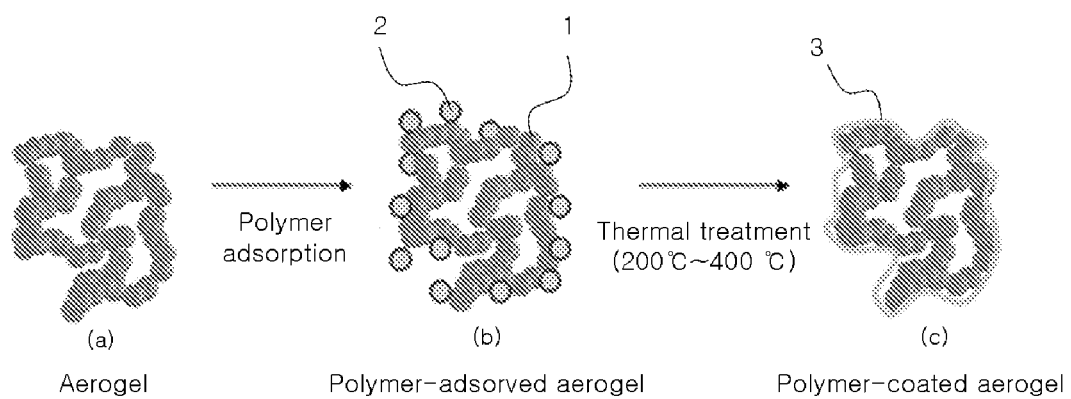
FIGS. 1 to 4 depict non-limiting exemplary embodiments described herein.

With reference now to the FIGS. 1(a), 1(b) and 1(c), the aerogel 1, in particulate form is dry blended with the organic polymer 3 which is in particulate form. The FIG. 1(a) depicts the aerogel 1 in particle form. The organic polymer particles 3 adhere to the surface of the aerogel particles by electrostatic forces as depicted in the FIG. 1(b) to form the aerogel-polymer composite. The aerogel-polymer composite is then heated to a temperature that is greater than the flow temperature of the organic polymer, which then causes the organic polymer to form a coating 3 around the aerogel particle. The formation of the coating 3 around the aerogel particles prevents moisture or solvents from getting into the aerogel pores. This preserves the aerogel structure and thus preserves the insulating properties of the aerogel 1. The presence of the organic polymer coating 3 on the aerogel particle provides the aerogel particle with an improved compatibility with other polymers as well as with organic solvents.

The aerogel generally comprises particles that have pores disposed therein. In order to have suitable insulating properties, it is desirable to use aerogels that have pore sizes of less than or equal to about 100 nanometers. The inside of the pores may be evacuated and contain no gas, or alternatively, the pores may be filled with gases such as oxygen, nitrogen, helium, carbon dioxide, or the like. By evacuating the pores, the thermal conductivity of the aerogels can be reduced. Similarly by filling the pores with higher molecular weight gases the thermal conductivity of the aerogels can be reduced.

The aerogel can be an organic aerogel, an inorganic aerogel or an organic-inorganic hybrid aerogel. Suitable examples of organic aerogels are resorcinol-formaldehyde aerogels, phenol-furfural aerogels, phenol-formaldehyde aerogels, polyurethane aerogels, polyimide aerogels, polyacrylate aerogels, chitosan aerogels, polymethyl methacrylate aerogels, aerogels derived from members of the acrylate family of oligomers, trialkoxysilyl terminated polydimethylsiloxane aerogels, polyoxyalkylene aerogels, polybutadiane aerogels, polyether aerogels, or the like, or a combination comprising at least one of the foregoing organic aerogels.

Suitable examples of inorganic aerogels are those manufactured from metal oxides. Examples of suitable metal oxides are metal oxides are silica, titania, zirconia, alumina, hafnia, yttria, ceria, stannous oxide, chromium oxide thoria, or the like, or a combination comprising at least one of the foregoing aerogels. A preferred aerogel for use in the fused aerogel-polymer composite is one that comprises silica.

Suitable examples of organic-inorganic hybrid aerogels include silica-PMMA aerogels, silica-chitosan aerogels, silica-polyethylene glycol aerogels, silica-polydimethylsiloxane aerogels, or the like, or a combination comprising at least one of the foregoing organic-inorganic hybrid aerogels.

There is no restriction on the aerogel particle sizes since the material is brittle and the particle sizes change during the dry blending. While there is no restriction on aerogel particles sizes, it is generally desirable to use aerogel particles having average particle sizes of about 1 micrometer to about 1 millimeters, preferably about 2 micrometers to about 20 millimeters, and more preferably about 2.5 micrometers to about 10 millimeters prior to dry blending. As will be described, during the dry blending process the aerogel particle sizes are reduced and become more uniform.

The organic polymer used to coat the aerogel particles may be an amorphous polymer or a semi-crystalline polymer. An exemplary polymer is a semi-crystalline polymer. Semi-crystalline polymers reduce the diffusion of moisture into the pores of the aerogel because of the crystals and thereby facilitate the long term preservation of the insulating properties of the aerogel. The organic polymer may be hydrophilic or hydrophobic. Semicrystalline hydrophilic polymers or semi-crystalline hydrophobic polymers can be used to coat the aerogel. In one embodiment, amorphous organic polymers having glass transition temperatures of greater than or equal to about 100° C. may be used. In another embodiment, a semi-crystalline organic polymer with a melting temperature of about 100 to about 400° C. may be used.

The organic polymer used in the fused aerogel-polymer composite may be selected from a wide variety of thermoplastic polymers, thermosetting polymers, blends of thermoplastic polymers, blends of thermosetting polymers, or blends of thermoplastic polymers with thermosetting polymers. The organic polymer can comprise homopolymers, copolymers, terpolymers, ionomers, dendrimers, or combinations comprising at least one of the organic polymers.

The organic polymers can include semi-crystalline polymers or amorphous polymers. Examples of the organic polymers that can be used are polyolefins such as polyethylene, polypropylene; polyamides such as nylon 4,6, nylon 6, nylon 6,6, nylon 6, 10, nylon 6, 12; polyesters such as polyethelene terephthalate (PET), polybutylene terephthalate (PBT), poly (ethylene naphthalate) (PEN), poly(butylene naphthalate) (PBN); polyarylates, polyimides, polyacetals, polyacrylics, polycarbonates (PC), polystyrenes, polyamideimides, polyacrylates, polymethacrylates such as polymethylacrylate, or polymethylmethacrylate (PMMA); polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polysiloxanes, or the like, or a combination comprising at least one of the foregoing organic polymers.

Examples of semi-crystalline hydrophilic polymers that can be used in the fused aerogel-polymer composite are polyvinylalcohol, polyvinylacetate, polyvinylpyrrolidone, polystyrene sulfonic acid neutralized with sodium salt, polyethylene oxide, or the like, or a combination comprising at least one of the foregoing semi-crystalline hydrophilic polymers.

Examples of semi-crystalline hydrophobic polymers that can be used in the fused aerogel-polymer composite are fluorinated polymers such as polyvinylidene fluoride, polyvinylidene fluoride-hexafluoropropylene, polytetrafluoroethylene; polyolefins, polyvinylchloride, polystyrene, or the like, or a combination comprising at least one of the foregoing semi-crystalline hydrophobic polymers.

As noted above, blends of thermoplastic polymers can be used. Examples of blends of thermoplastic polymers include acrylonitrile-butadiene-styrene/nylon, acrylonitrile butadiene styrene/polyvinyl chloride, polyphenylene ether/nylon, polycarbonate/polyurethane, polycarbonate/polyethylene terephthalate, polyethylene terephthalate/polybutylene terephthalate, or the like.

Examples of thermosetting polymers suitable for use in the fused aerogel-polymer composite include epoxy polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination comprising at least one of the foregoing thermosetting polymers.

In order to increase the thermal insulation properties of the fused aerogel-polymer composite, it is desirable to use the hydrophobic organic polymer. The hydrophobic organic polymer prevents the ingress of moisture or water into the aerogel thereby preserving the aerogel structure. The use of a hydrophobic organic polymer to coat the aerogel permits the fused aerogel-polymer coating to be used in subsequent manufacturing processes where solvents and water are employed. The hydrophobic organic polymer coating prevents ingress of water during the subsequent preparation of an aerogel coating agent or when manufacturing a urethane foam composite comprising a solvent and other additives, thus making it possible to prepare foam having uniform pores.

The organic polymers are in particulate form. The organic polymers generally have a particle size that permits electrostatic forces to promote adhesion between the organic polymer particles and the aerogel particles. The organic polymers generally have average particle sizes of about 1 to about 100 micrometers, preferably about 3 to about 75 micrometers, and more preferably about 5 to about 50 micrometers. When the average particle size of the polymer particles is less than 1 micrometer, the polymer powder flies off, and does not adhere to the surface of the aerogel particles. This leads to difficulties in forming the aerogel-polymer composite. On the other hand, when the particle size exceeds 100 micrometer, it is difficult to form a uniform organic polymer coating on the surface of the aerogel particles.

The aerogel particles and the organic polymer may be blended in a volume ratio of about 1:1 to about 1:3, preferably about 1:1.2 to about 1:2.75 and more preferably about 1:1.4 to about 1:2.50 respectively. If the volume ratio of the aerogel to polymer is less than 1:1, the uniform polymer coating is difficult to form on the surface of the aerogel. On the other hand, if the volume ratio exceeds 1:3, the polymer particles may aggregate during the course of thermal treatment.

In one embodiment, in one method of manufacturing the fused aerogel-polymer composite, the aerogel particles and the polymer particles are first dry blended together as shown in the FIG. 1(b). The dry blending is carried out in a device that uses shear forces, elongational forces, extensional forces and/or compressional forces. The dry blending may be carried out in a mixer such as, for example, a ball, mill, a jet mill, a Henschel mixer, a Waring blender, a drum mixer, a ribbon mixer, a vertical spiral mixer, a Muller mixer, a sigma mixer, a chaotic mixer, a single or multiple screw extruder, and the like. The dry blending is generally carried out at room temperature. An exemplary mixer is a ball mill. The rotation speed of the ball mill and the length of mixing can be varied depending upon the aerogel particle size desired. During the dry blending the polymer particles are adsorbed on the surface of the aerogel particles.

Following the dry blending, the aerogel-polymer composite may be optionally sieved to remove extraneous polymer that is not adhered to the aerogel. Other methods of agitation may be used to remove the extraneous polymer if desired.

The aerogel-polymer composite thus formed after the dry blending is then subjected to a thermal treatment, thus obtaining an aerogel having a uniform polymer coating disposed on the surface. During the thermal treatment, the polymer adsorbed on the surface of the aerogel is instantaneously melted at a high temperature to form a coating on the surface of the aerogel. The polymer coating solidifies on the surface of the aerogel due to the difference in temperature, thereby forming a uniform polymer coating 3 on the surface of the aerogel 1 as can be seen in the FIG. 1(c).

There is no particular limit to the thickness of the polymer coating 3 formed on the surface of the aerogel 1. The thickness is generally dependent upon the amount of the volume ratio of the aerogel to the polymer in a particular blend. It is generally desirable for the polymer coating 3 to have a thickness of about 1 to about 50 micrometers.

The temperature during the thermal treatment may be varied depending upon the type and amount of the polymer. In general, it is desirable for the for the thermal treatment to be conducted at a temperature of about 50 to about 100° C. above the flow temperature of the polymer if the polymer is amorphous or above the melting temperature of the polymer if the polymer is semi-crystalline. In general it is desirable to conduct the thermal treatment in an oven at a temperature of about 150 to about 500° C. for a period of about 1 minute to about 10 hours. This is because the polymer adsorbed on the aerogel is instantaneously melted in the course of thermal treatment to coat the surface of the aerogel, whereas the polymer that is not adsorbed on the aerogel remains in the form of beads because of aggregation. As can be seen in the FIG. 1(c), the aerogel 1 is coated with the polymer 3 thus preserving the pores within the aerogel while at the same time coating the aerogel particle surface to protect it from moisture or solvents. Since the aerogel particles are coated, the pores of the aerogel particles are not exposed to the moisture or to solvents during additional manufacturing processes. As a result of this method of coating of the aerogel particles, the porosity of the aerogel particles is not reduced during the formation of the fused aerogel-polymer composite. The thermal conductivity of the fused aerogel-polymer composite is also decreased when compared with that of an uncoated aerogel.

In another embodiment, the surface area of the coated aerogel particles is reduced due to the coating. Despite this reduction in surface area the thermal conductivity of the fused aerogel-polymer composite is improved over an uncoated aerogel. As will be noted, the aerogel is coated with the organic polymer not through a chemical bond but through a physical bond, and the properties of the polymer-coated aerogel thus prepared may therefore vary depending on the type of polymer used.

In one embodiment, the heat treatment may be conducted in a molding machine such as for example, an injection molding machine or a compression molding machine. In one embodiment, the aerogel-polymer composite may be loaded into the barrel of an injection molding machine and subjected to the appropriate temperature and pressure to form or to shape the fused aerogel-polymer composite into a monolithic piece. In another embodiment, the aerogel-polymer composite may be loaded into a mold in a compression molding machine and subjected to the appropriate temperature and pressure to form or to shape the fused aerogel-polymer composite into a monolithic piece.

The resulting fused aerogel-polymer composite formed as a result of the heat treatment has a porosity ranging from about 70% to about 98%, preferably from about 80 to about 97%, and more preferably from about 85 to about 95%. In another embodiment, the fused aerogel-polymer composite has a specific surface area ranging from about 50 square meter per gram ($m^2/g$) to about 350 $m^2/g$, preferably about 100 to about 340 $m^2/g$, and more preferably about 120 to about 320 $m^2/g$. In another embodiment, the fused aerogel-polymer composite has a thermal conductivity ranging from about 7 milliwatt per meter-Kelvin (mW/mK) to about 25 mW/mK, preferably about 8 to about 23 mW/mK, and more preferably about 10 to about 21 mW/mK.

Further, the fused aerogel-polymer composite may have a thermal conductivity that is reduced when compared with and uncoated aerogel. In one embodiment, the fused aerogel-polymer composite has a thermal conductivity that is about 2 to about 8% lower than that of an aerogel that is not bonded or coated with a polymer. The amount of reduction in the thermal conductivity is dependent upon the structure or porosity of the aerogel. By coating the aerogel as disclosed above, the mechanical stability of the aerogel is substantially improved. In addition, coating the aerogel reduces the possibility of destruction of the aerogel as a result of the ingress of moisture or solvents into the pores of the material.

The fused aerogel-polymer composite may be used alone or in the form of a composite with a binder, or may be incorporated in a vacuum-insulated structure. Because of the presence of the organic polymer coating, the fused aerogel-polymer composite may be molded or formed into various convenient shapes. The fused aerogel-polymer composite may be used as a thermal insulator in appliances, residential and office buildings, ships and airplanes, and so on. In particular, the fused aerogel-polymer composite may be used as thermal insulation material for refrigerators, freezers, and thermal reservoirs. It may also be used in electrode active materials, catalyst supports, noise absorbing materials, exhaust gas adsorbents, dielectric materials, and other electrode materials.

The fused aerogel-polymer composite may also be formed into various shapes. The fused aerogel-polymer composite may also be manufactured in the form of various monolithic sheets or blocks by impregnating into the fuse aerogel-polymer composite a fabric or fabric webbing that can comprise non-woven fabric. The fused aerogel-polymer composite may be incorporated in a vacuum-insulated structure. There are no limitations on applications where the fused aerogel-polymer composite or the aerogel-polymer composite can be used.

A better understanding of the invention may be obtained through the following examples and comparative examples, which are set forth to illustrate, but not to limit the present invention.

EXAMPLES

Example 1

The following examples were conducted to demonstrate the superior properties of the fused aerogel-polymer composite over an aerogel. 20 grams of silica aerogel powder having a particle size of 1 to 3 millimeter (mm) having the brand name TLD 302® from Cabot. TLD 302 is a translucent aerogel having a particle size of 1 to 3 mm. 100 grams of PVDF-HFP (polyvinylidenefluoride-hexafluoropropylene) copolymer powder commercially available from Atofina Company and having a particle size of less than 3 millimeters. The aerogel powder and the PVDF-HFP in an amount of 12% by weight were loaded into a plastic container and were then subjected to ball milling at 1300 rpm for 4 hours or longer. The ball milling was conducted at room temperature.

During the ball-milling, the polymer was adsorbed onto the surface of the aerogel to form the aerogel-polymer composite. The aerogel-polymer composite thus obtained was subjected to thermal treatment in an oven at 250° C. for about 5 minutes to form the fused aerogel-polymer composite. After the thermal treatment, the fused aerogel-polymer composite was separated from the remaining polymer that was not adsorbed on the surface of the aerogel by agitating it in a sieve having a mesh size of 100 micrometers. The remaining polymer, which was not adsorbed on the aerogel, was melted, formed into beads, and separated using the sieve.

Figure 2:
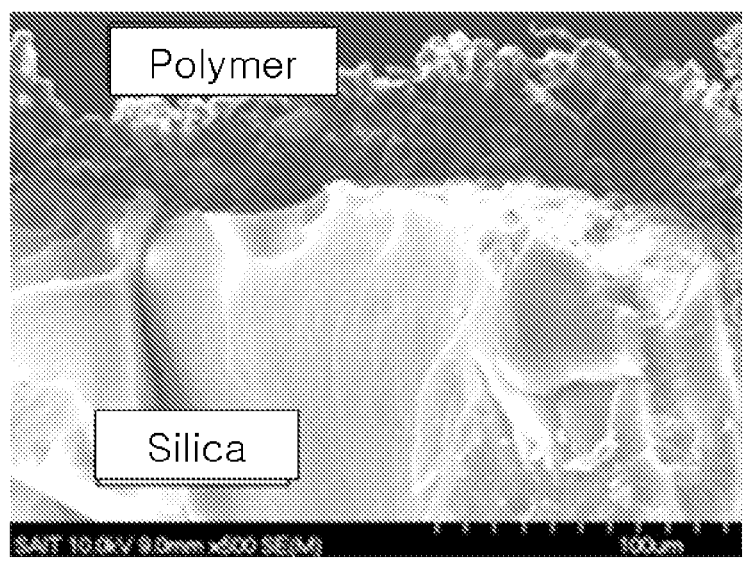

The cross-section of the polymer-coated aerogel thus obtained was observed using an FE-SEM (Field Emission Scanning Electron Microscope) (Model S-4700®, available from Hitachi). The image thereof is shown in FIG. 2. From FIG. 2, it can be seen that a uniform polymer coating was formed on the surface of silica aerogel.

Example 2

Polymer-coated aerogel was prepared in the same manner as in Example 1, with the exception that silica aerogel, TLD 203® (translucent aerogel having a particle size of 1 to 5 micrometers, available from Cabot) was used.

Example 3

Polymer-coated aerogel was prepared in the same manner as in Example 1, with the exception that PVDF-HFP having an HFP content of 20% by weight and silica aerogel, TLD 201® (opaque aerogel having a particle size of 1 to 5 micrometers, available from Cabot) were used.

Example 4

Polymer-coated aerogel was prepared in the same manner as in Example 2, with the exception that PVDF-HFP having an HFP content of 20% by weight was used.

Comparative Examples 1 to 4

The performance of the fused aerogel-polymer composites was compared with that of an aerogel that does not have the polymeric coating disposed thereon. TLD 302® (Comparative Example 1), TLD 203® (Comparative Example 2), and TLD 201® (Comparative Example 3), available from Cabot, were used, and blanket type aerogel (Comparative Example 4), available from Cabot, was used.

Experimental Example 1

Figure 3:
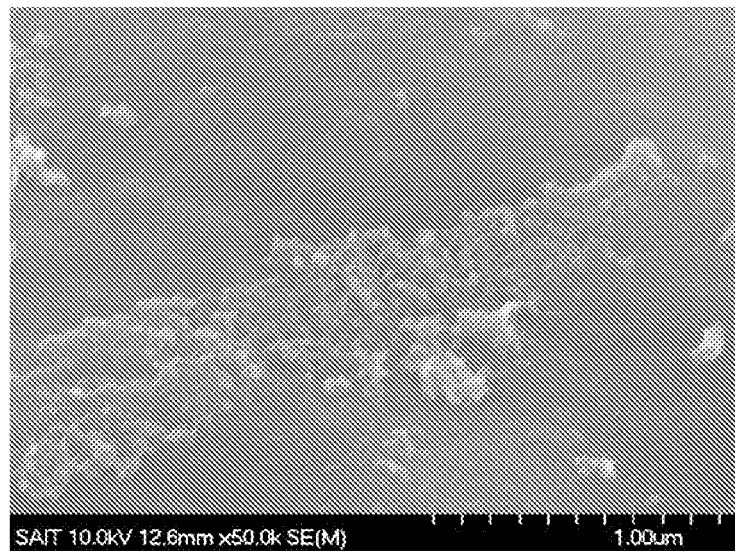
Figure 4:
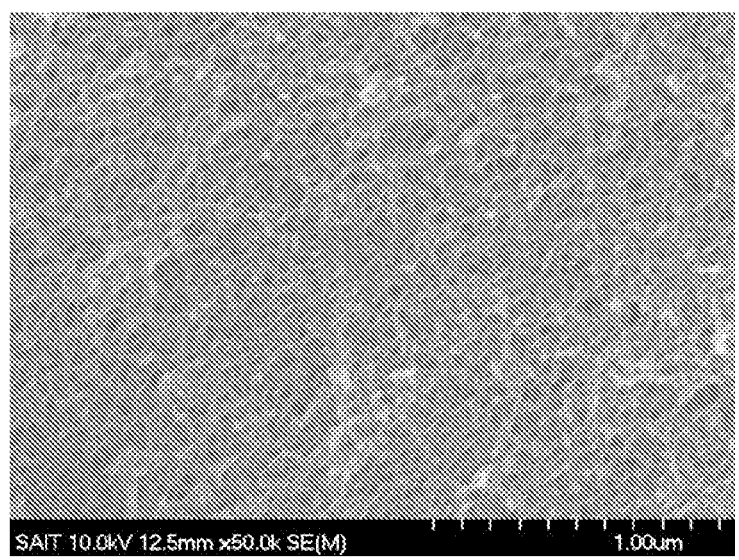

The outer surface of the aerogel prepared in Example 1 and the outer surface of the silica aerogel (TLD 302®), available from Cabot, in the comparative example, were observed using an FE-SEM. The images thereof are shown in FIGS. 3 and 4. The microscope used in the experiment was a Model S-4700®, available from Hitachi.

As seen in FIG. 4, many pores are distributed and exposed on the surface of the TLD 302® aerogel, whereas the fused aerogel-polymer composite of Example 1 is completely coated with the polymer, as seen in the FIG. 2.

Experimental Example 2

The aerogel of each of Examples 1 to 4 and the aerogel of each of Comparative Examples 1 to 4 were measured for thermal conductivity through a hot wire method. The results are given in Table 1 below. Measurement was conducted using a Mathis TCi hot wire type instrument, available from Mathis Instruments, USA. The hot wire type measurement is conducted by placing a sample of the aerogel or the fused aerogel-polymer composite on a 17 mm sized sensor, applying current to the sensor, and measuring heat transfer and other thermal properties using the sensor. The results are shown in the Table 1 below.

TABLE 1

| | Ex. 1 | C. Ex. 1 | Ex. 2 | C. Ex. 2 | Ex. 3 | C. Ex. 3 | Ex. 4 | C. Ex. 4 |
|---|---|---|---|---|---|---|---|---|
| Aerogel | Coated TLD 302 | TLD 302 | Coated TLD 203 | TLD 203 | Coated TLD 201 | TLD 201 | Coated TLD 203 | Cabot Silica sheet |
| PVDF-HFP (HFP content) | 12% | | 12% | | 20% | | 20% | |

TABLE 1-continued

| | Ex. 1 | C. Ex. 1 | Ex. 2 | C. Ex. 2 | Ex. 3 | C. Ex. 3 | Ex. 4 | C. Ex. 4 |
|---|---|---|---|---|---|---|---|---|
| Specific Surface Area ($m^2/g$) of Polymer-coated Aerogel | 280.57 | 700.85 | 296.75 | 607.45 | 79.53 | 639.73 | 276.95 | — |
| Thermal Conductivity (mW/mK) | 6.745 | 7.134 | 9.606 | 10.472 | 9.361 | 9.361 | 11.391 | 22.118 |

As is apparent from Table 1, the sheet type aerogel of Comparative Example 4 has higher thermal conductivity than the pure aerogel of each of Comparative Examples 1 to 3, remarkably decreasing thermal insulation properties. However, the thermal insulation properties of the fused aerogel-polymer composite of each of Examples 1 to 4 show that they are improved by about 5 to about 8% when compared to the pure aerogel of each of Comparative Examples 1 to 3 that are not coated with the polymer, and are improved by about 70% compared to the sheet type aerogel of Comparative Example 4.

This shows that the polymer coating present in the fused aerogel-polymer composite surrounds the open pores of the aerogel so that the open pore structure of the aerogel is converted into a closed pore structure, thereby causing an improvement in the thermal insulation properties. Without being limited by theory, it is believed that most of heat passes through the interface between aerogel particles, which under normal circumstances comprises air. However, when the aerogel particles are coated with a polymer coating, transfer of heat through this polymer interface is less than that which would be transferred through an air interface, because the polymer is less thermally conductive than air. This reduces the thermal conductivity of the polymer-coated aerogel when compared with an uncoated aerogel.

Without being limited by theory, it is believed that the PVDF-HFP having low HFP content of Examples 1 and 2 exhibits a lower elasticity than the PVDF-HFP having high HFP content of Examples 3 and 4. The samples in Examples 3 and 4 having the higher elastic content may be more efficiently attracted to the aerogel due to electrostatic force, resulting in higher thermal insulation properties.

As described herein, the exemplary embodiments provide a method of preparing aerogel-polymer composite, a fused aerogel-polymer composite, and articles comprising the same. According to the example embodiments, the fused aerogel-polymer composite may be prepared by subjecting an aerogel and a polymer to mixing in a dry state, without the use of a solvent, and then to thermal treatment. When a polymer coating is formed on the aerogel through thermal treatment, the high thermal insulation properties of the aerogel are maintained, while the physical strength and processability of the aerogel may be improved. Moreover, because the pores of the aerogel are not exposed, the aerogel may be mixed with other solvents or solutes and thus used in the form of composites or mixtures, without a decrease in the properties.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method of preparing a fused polymer-coated aerogel comprising:
    mixing an inorganic aerogel with organic polymer particles to form an aerogel-polymer composite; the organic polymer particles having an average particle size of about 1 to about 100 micrometers;
    heat treating the aerogel-polymer composite to form a fused aerogel-polymer composite; wherein mixing the inorganic aerogel with the organic polymer particles is performed by dry blending such that the organic polymer particles adhere to a surface of the inorganic aerogel by electrostatic forces; wherein the heat treating is conducted at a temperature of about 50 to about 100° C. higher than a flow point or a melting point of the organic polymer for a period of time of about 1 minute to about 10 hours.

2. The method of claim 1, wherein the organic polymer particles have a melting point of about 100° C. to about 400° C.

3. The method of claim 1, wherein the organic polymer particles are selected from the group consisting of a thermoplastic polymer, a thermosetting polymer, a blend of a thermoplastic polymer, a blend of thermosetting polymers, a blend of thermoplastic polymers with thermosetting polymers, homopolymers, copolymers, terpolymers, ionomers, dendrimers, semi-crystalline polymers, amorphous polymers, hydrophobic polymers, hydrophilic polymers, and a combination comprising at least one of the foregoing organic polymers.

4. The method of claim 1, wherein the organic polymer is a crystalline hydrophilic polymer.

5. The method of claim 1, wherein the crystalline hydrophilic polymer is selected from the group consisting of polyvinylalcohol, polyvinylacetate, polyvinylpyrrolidone, polystyrene sulfonic acid neutralized with sodium salt, polyethylene oxide, and a combination comprising at least one of the foregoing crystalline hydrophilic polymers.

6. The method of claim 1, wherein the organic polymer particles comprise a crystalline hydrophobic polymer.

7. The method of claim 6, wherein the crystalline hydrophobic polymer is selected from the group consisting of polyvinylidene fluoride, polyvinylidene fluoride-hexafluoropropylene, polytetrafluoroethylene, polystyrene, polyvinylchloride, and a combination comprising at least one of the foregoing crystalline hydrophobic polymers.

8. The method of claim 1, wherein the aerogel and the organic polymer particles are present in a volume ratio of about 1:1 to about 1:3.

9. The method of claim 1, wherein aerogel is blended with the organic polymer particles in a ball mill, a jet mill, a Henschel mixer, a Waring blender, a drum mixer, a ribbon mixer, a vertical spiral mixer, a Muller mixer, a sigma mixer, a chaotic mixer, a single screw extruder, a multiple screw extruder, or a combination comprising at least one of the foregoing mixers.

10. The method of claim 1, further comprising molding the fused aerogel-polymer composite to form a monolith.

* * * * *